United States Patent [19]
Johnston et al.

[11] Patent Number: 5,315,700
[45] Date of Patent: May 24, 1994

[54] METHOD AND APPARATUS FOR RAPIDLY PROCESSING DATA SEQUENCES

[75] Inventors: Richard S. Johnston, Issaquah; Paul V. Budak; Robert C. Schmidt, both of Redmond; Shih-Jong J. Lee, Bellevue, all of Wash.

[73] Assignee: NeoPath, Inc., Bellevue, Wash.

[21] Appl. No.: 838,070

[22] Filed: Feb. 18, 1992

[51] Int. Cl.⁵ .............................................. G06F 3/14
[52] U.S. Cl. .................................... 395/163; 395/162; 395/164; 345/185; 345/201
[58] Field of Search ............... 395/100, 118, 162, 163, 395/164 ∝ 166, 141; 382/49, 54; 340/728, 750, 798-799; 345/185, 201

[56] References Cited

U.S. PATENT DOCUMENTS

| | | | |
|---|---|---|---|
| 4,300,192 | 11/1981 | Couleur et al. | 364/200 |
| 4,363,104 | 12/1982 | Nussmeier | 364/200 |
| 4,479,176 | 10/1984 | Grimshaw | 364/148 |
| 4,545,068 | 10/1985 | Tabata et al. | 395/163 |
| 4,949,280 | 8/1990 | Littlefield | 395/163 |
| 5,016,191 | 5/1991 | Radochonski | 395/166 |
| 5,048,109 | 9/1991 | Bloomberg et al. | 382/50 |
| 5,136,500 | 8/1992 | Lamoy et al. | 364/200 |

OTHER PUBLICATIONS

"Computer System Architecture" 2nd edition, by M. Morris Mano, 1982, Prentice-Hill, Inc.

Primary Examiner—Dale M. Shaw
Assistant Examiner—Kee M. Tung
Attorney, Agent, or Firm—Leone & Moffa

[57] ABSTRACT

Improved method and apparatus are provided for performing parallel and pipeline processing of data sequences. The apparatus includes a plurality of memory circuits and a plurality of data processors wherein each data processor is constructed for parallel and pipeline processing of data sequences. Address controllers are provided for routing data between the memory circuits and the pixel processors. The address controllers are capable of directly coupling any memory circuit to any pixel processor so that data may be simultaneously transferred from a plurality of memory circuits to a plurality of pixel processors. Further, the pixel processors are provided with processing elements for performing data processing on neighboring data words of a data sequence. The address controller is constructed for providing data from the memory circuits in a plurality of sequences so that the data may be provided to the pixel processor first and second times in respective first and second sequences to enable two dimensional processing of the data sequence. A feature processor is provided for extracting specific information from the processed image data, relating to features of objects contained therein.

14 Claims, 10 Drawing Sheets

METHOD AND APPARATUS FOR RAPIDLY PROCESSING DATA SEQUENCES

TECHNICAL FIELD

The present invention is directed toward a method and apparatus for rapidly processing data sequences and, more particularly, toward a method and apparatus for pipelined and parallel processing of data sequences representing images.

BACKGROUND OF THE INVENTION

Many systems have been developed for processing data sequences representing images. Several such systems, referred to herein as image enhancement systems, have been provided for obtaining data representing images, i.e., image data, wherein the image may represent physical features of a biological specimen. As examples, image enhancement systems have been developed for obtaining images of internal organs of a patient in a non-intrusive manner, for example, nuclear magnetic resonance devices, ultrasound imaging, CAT scan imaging, etc. These devices are typically used for capturing and processing data to provide an image of a functional system of a patient, as for example, the patient's heart, lungs, etc. The processing of the image data performed by these devices is primarily to insure the accuracy and clarity of the resulting image.

Other systems, referred to herein as image analysis systems, have been provided for obtaining image data of specimens taken from a patient. As examples, devices have been provided for obtaining image data representing blood cells, bone marrow cells, brain cells, etc. These systems are typically designed to capture and process image data to determine characteristics of the specimen, as for example, blood cell count. The processing of the image data performed by these systems are primarily to analyze the image data for determining whether the specimen exhibits the characteristic.

In any of the foregoing imaging systems, a large amount of data is typically required to accurately represent the image. Also, in order to obtain meaningful information from the captured image data, a large number of data processing steps must be performed. This is true whether the processing is performed to enhance the image data, as is done in image enhancement systems, or whether the processing is performed to analyze the image data, as is done in image analysis systems.

Due to the large number of data processing operations required, designers of these systems have attempted to provide circuits for processing the image data in a pipelined and parallel fashion, i.e., continuously and simultaneously, so that data throughput can be increased and thereby the time required to perform the image enhancement or image analysis can be reduced. However, the effectiveness of prior pipelined and parallel processing circuits has been limited due to the inability of prior circuitry to adequately route data between the memory devices and the processing circuits. Accordingly, it is desirable to provide method and apparatus for effectively routing data between memory devices and a plurality of processing circuits to enhance the throughput of pipelined and parallel image processing circuitry.

With particular respect to image analysis systems, it is often desirable to be able to process segments of the image data stored in memory, wherein the segments represent a portion of the image. It is further desirable to be able to provide image data in a manner so that the boundary of the image is clearly defined. Providing image data in this manner enables faster evaluation of the image data. Accordingly it is desirable to provide apparatus for routing image data between memory devices and a plurality of processing circuits wherein the apparatus is constructed to select any portion of the stored image data and to clearly identify the boundary of the image portions selected.

SUMMARY OF THE INVENTION

The subject invention provides apparatus for rapidly processing data sequences including a plurality of memory circuits for storing the data sequences wherein each of the plurality of memory circuits includes a memory input and a memory output. The apparatus further includes a plurality of processing circuits for processing the data sequences wherein each of the plurality of processing circuits includes a data output for providing an output data sequence. Each of the plurality of processing circuits further includes a first multiplexor circuit for receiving a plurality of input data sequences wherein the first multiplexor circuit is responsive to a first select control signal for selecting at least one of the plurality of input data sequences to be processed to provide its respective output data sequence. A plurality of controller circuits is each associated with a respective one of the plurality of memory circuits for transferring the data sequences between the plurality of memory circuits and the plurality of processing circuits. The plurality of controller circuits each includes a second multiplexor circuit for receiving the plurality of output data sequences and is responsive to a second select control signal for selecting at least one of the plurality of output data sequences to be stored in its respective one of the plurality of memory circuits. A central processor is responsive to user-provided input for providing the first and second select control signals to control the transfer of the data sequences between the plurality of memory circuit and the plurality of processor circuits.

DETAILED DESCRIPTION OF THE INVENTION

Figure 1:
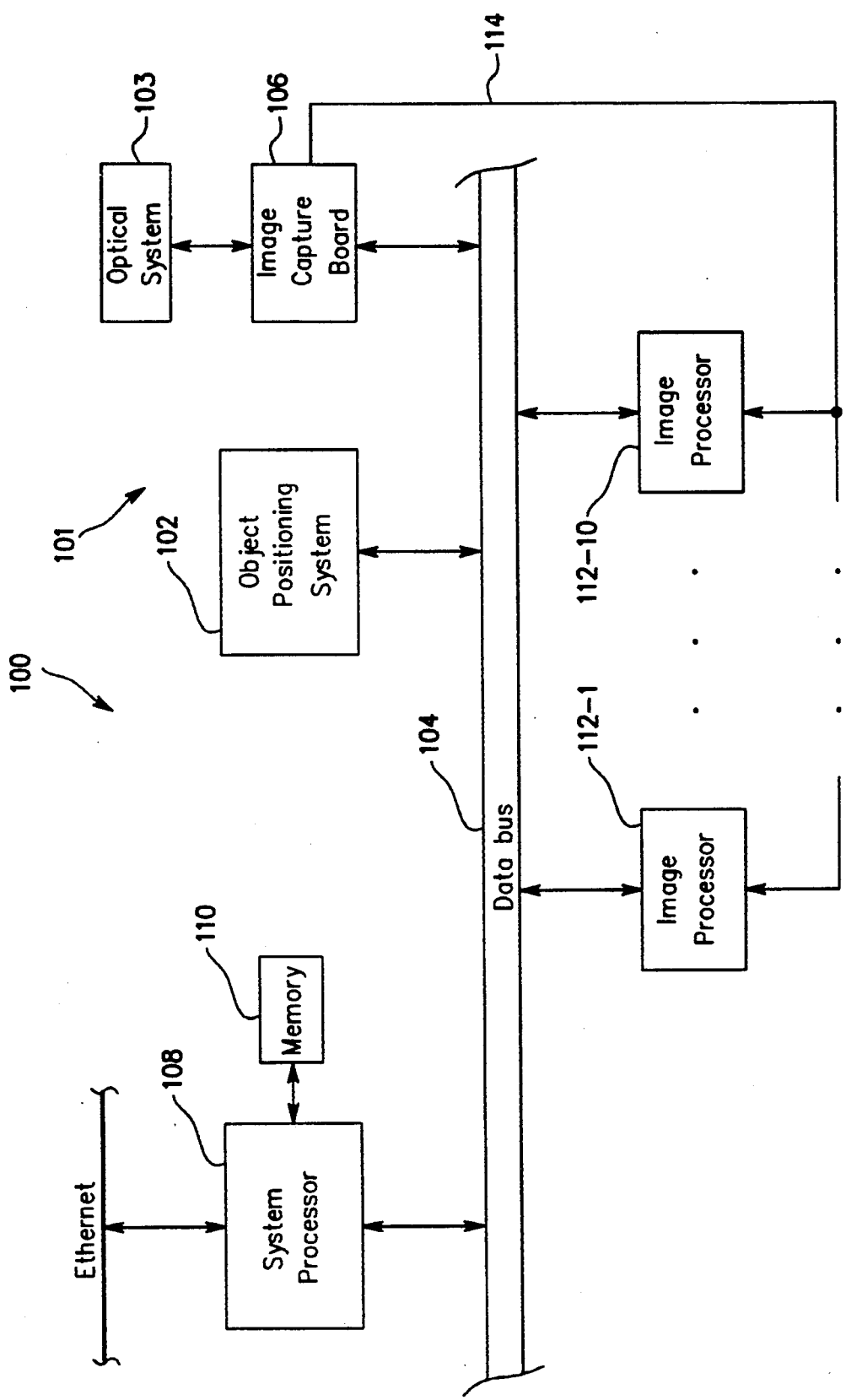
FIG. 1 is an illustrative block diagram showing the image capture and processing system of the subject invention.

An image capture and processing system 100 is illustrated in FIG. 1. The image capture and processing system 100 is provided for capturing and processing data representing an image. In a presently preferred embodiment of the invention, the image capture and processing system 100 is constructed to capture and analyze image data representing cells of the human body for use in cervical Pap smear analysis. However, those skilled in the art will recognize that the subject invention may be readily adapted for performing other types of image analysis. Further, those skilled in the art will recognize that the subject invention could be used in image enhancement systems constructed for capturing and enhancing image data to provide an image of an object.

The image capture and processing system 100 includes an image gathering system 101 for gathering the image data of the object to be imaged. The image gathering system 101 may include an optical system 103 for obtaining the image data to be processed by the image capture and processing system 100. The optical system 103 may include a digital camera and associated optics for illuminating the object and providing the image data. Further, the image gathering system 101 may include an object-positioning system 102 for positioning the object to be imaged. The image-gathering system 101 may also include an image capture board 106 for controlling the focus of the optical system and for correcting the image signals to eliminate noise introduced by the optical system 103. The image-capture board 106 may also be constructed to digitize the image signals received from the optical system 103.

As an example, the image gathering system 101 may include a precision motion controller coupled with a microscope for positioning a slide under the objective of the microscope to enable the microscope to provide images of a specimen contained on the slide, wherein the images are provided to a digital camera and are illuminated by a strobe light, the entire system being controlled by a data processor. Such a system is shown as and described in U.S. patent application Ser. No. 07/838,063, for *Method And Apparatus For Rapid Capture Of Focused Microscope Images*, by Jon W. Hayenga et al., filed Feb. 18, 1992, and U.S. patent application Ser. No. 07/838,065, for *Method And Apparatus For Dynamic Correction Of Microscope Image Signals*, by Jon W. Hayenga et al., filed Feb. 18, 1992, the disclosures of which are incorporated herein, in their entireties, by the foregoing references thereto. Those skilled in the art will recognize that other devices for obtaining the image data to be processed may be substituted for the image gathering system 101 without departing from the spirit of the subject invention.

In the presently preferred embodiment of the invention, the image-gathering system 101 is constructed to provide an image of a field-of-view of the camera of the optical system 103. The camera is constructed to scan a slide mounted to the object positioning system 102, and may provide as many as 15,000 field-of-view images for each slide. The image capture and processing system 100 is constructed to capture and process each of the field-of-view images provided by the optical system 103.

A system processor 108 is coupled to memory 110 and the data bus 104 for controlling the image capture and processing system 100. The image-gathering system 101 is also coupled to the data bus 104 for transmitting and receiving control and status information to and from the system processor 108. As illustrated in FIG. 1, the system processor 108 may be coupled to a data processor network such as an Ethernet, or other network, for permitting data transfer between other image capture and processing systems or other data processing devices. The memory 110 is constructed for storing program data and instructions for use by the system processor 108. The memory 110 may further be constructed for storing image data or other data relating to the images captured by the image capture and processing system 100.

In a presently preferred embodiment of the invention, the optical system 103 includes a camera constructed to provide the field-of-view image data in an array of data words wherein each data word is associated with a pixel, or element, of the camera. Further, in accordance with a presently preferred embodiment of the invention, each data word is an eight-bit binary data word wherein the binary value of the data word is proportional to the intensity of light on its associated pixel. The optical system 103 is further constructed to provide an array of 512×512 data words, representing an array of 512×512 pixels, for each field-of-view image. However, those skilled in the art will appreciate that the present invention is equally applicable for use with image-gathering systems constructed to provide more or less data for each field-of-view image.

To permit substantially simultaneous processing of a plurality of images, the image capture and processing system 100 includes a plurality of substantially identical image processing circuits 112-1 through 112-10. The plurality of image processing circuits 112 are each coupled to an image data bus 114 for receiving the field-of-view image data from the image capture board 106. The system processor 108 monitors the plurality of image processors 112, over the data bus 104, to allocate the field-of-view images between the image processors. Each image processing circuit 112 is constructed to process image data representing a single field-of-view image. Each image processor 112 is further constructed for substantially parallel and pipelined processing of a field-of-view image, as will be described in more detail below. The plurality of image processors 112-1 through 112-10 process the field-of-view images in parallel so that the image capture and processing system 100 is capable of substantially pipelined and parallel processing of field-of-view image data.

As discussed above, the image capture and processing system 100 is constructed to provide image analysis of an object on a slide. To this end, the plurality of image processing circuits 112 are constructed to perform image analysis processing on the image data provided by the image capture board 106. As examples, the image processing circuits of the subject invention are constructed to perform distance transforms, binary morphology, greyscale morphology, binomial filtering, histograms, grey-level accumulation, run-length encoding, image thresholding, arithmetic operations, logic operations, and zone of influence analysis. However, those skilled in the art will appreciate that the image processing circuits 112 may be modified to perform other functions in addition to, or in lieu of, those described herein.

Figure 2:
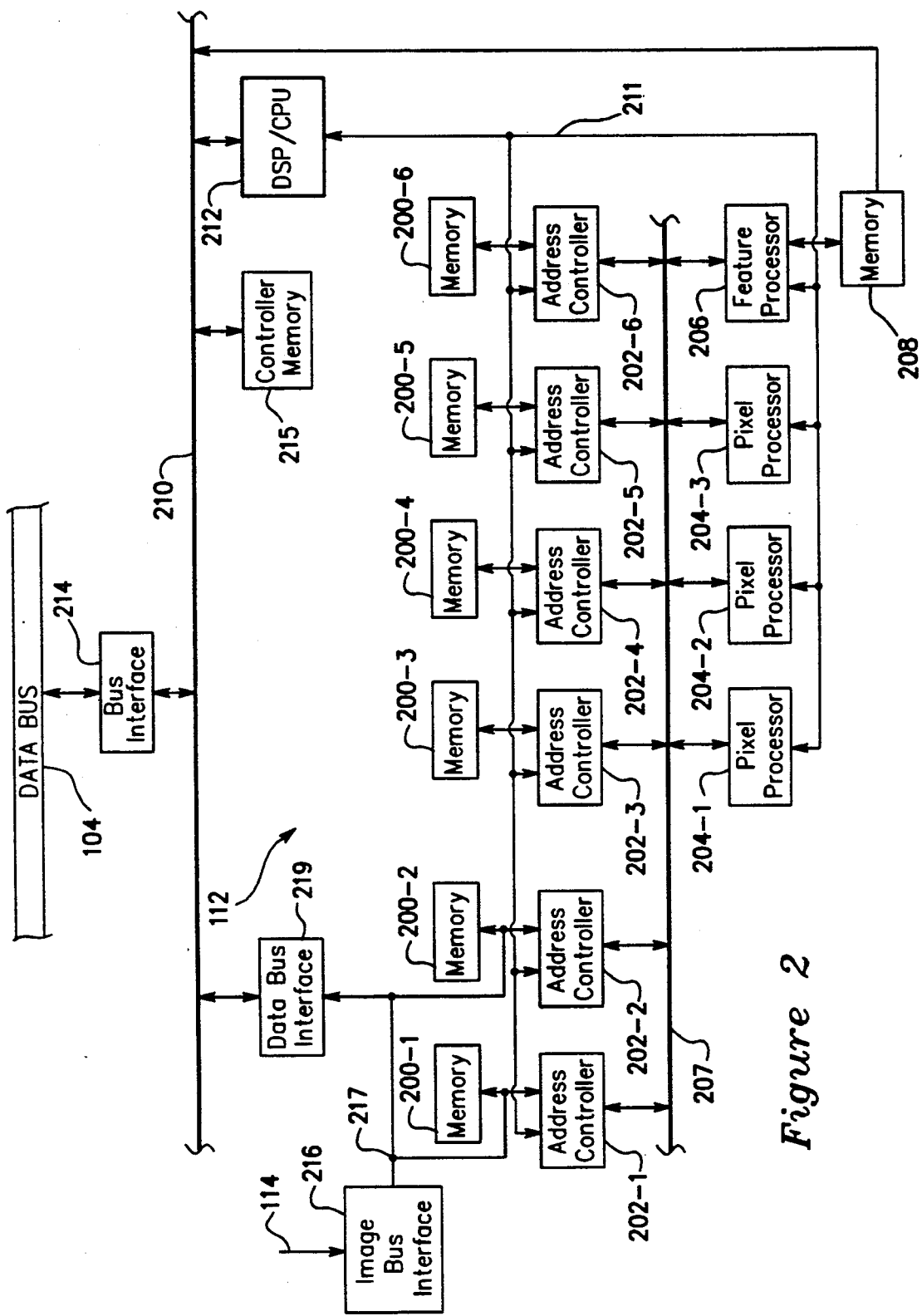
FIG. 2 is a more detailed illustrative block diagram of the image processor 112 of the image capture and processing system 100 illustrated in FIG. 1.

Referring to FIG. 2, each image processor 112 includes a plurality of memory circuits 200-1 through 200-6 each associated with a respective one of a plurality of address controllers 202-1 through 202-6. The memory circuits 200-1 and 200-2 are constructed for storing one or more field-of-view images provided by the image capture board 106. As discussed above, each image processor 112 is constructed for substantially parallel and pipelined processing of data representing the field-of-view images stored in the memory circuits 200-1 and 200-2. The memory circuits 200-3 through 200-6 are employed to store data representing various, intermediate forms of the field-of-view image during processing. As an example, the memory circuits 200-3 through 200-6 may be used to store a greyscale representation of the field-of-view image, a distance transform representation of the field-of-view image, etc. In a presently preferred embodiment of the invention, each memory circuit 200 is constructed for storing at least two eight-bit greyscale images and, preferably, four images.

The address controllers 202 are provided for interfacing the memory circuits 200 with a plurality of pixel processors 204-1 through 204-3 and a feature processor 206, through a connection network 207. The connection network 207 may be configured for coupling the address controllers 202 and the pixel processors 204 so that data is transferred between any address controller and any pixel processor. Further, the connection network 207 may be configured so that data is transferred simultaneously to each of the pixel processors and feature processor, from any of the address controllers. As an example, the image processing circuit 112 may be configured so that data is transferred from the memory circuit 200-1 to the pixel processor 204-1 at the same time data is being transferred from the memory circuit 200-3 to the pixel processors 204-2 and 204-3. Various other combinations of data transfer between the memory circuits 200 and the pixel processors 204 and feature processor 206 are possible, as will be described below by reference to FIG. 3.

Figure 3:
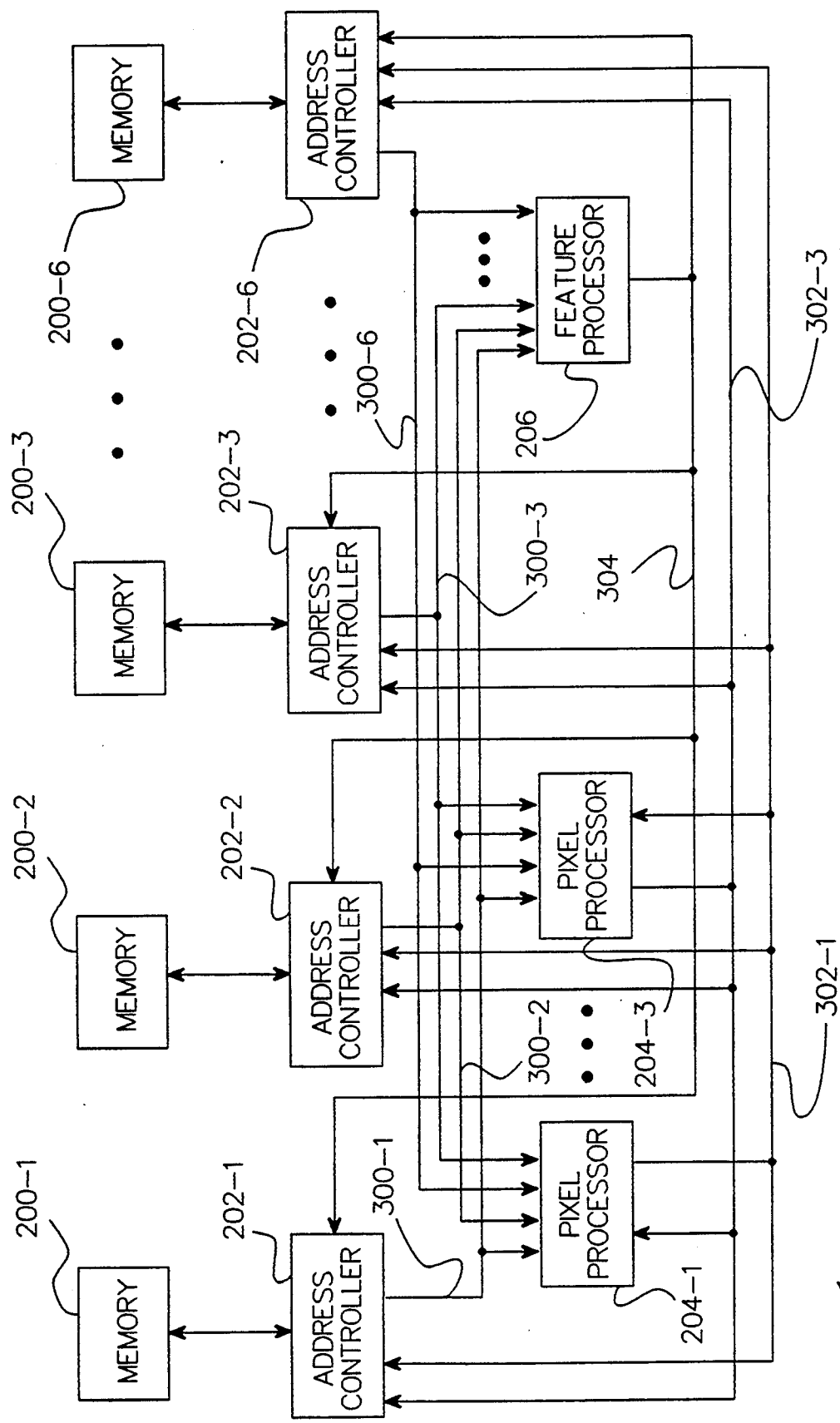
FIG. 3 is a block diagram illustrating the interconnection of the address controllers 202 and pixel processors 204 illustrated in FIG. 2.

With reference to FIG. 3, each address controller 202-3 through 202-6 includes an output having an independent connection 300-1 through 300-6 to each pixel processor 204 and the feature processor 206. Accordingly, each address controller 202 can provide data from its respective memory circuit 200 to any of the pixel processors 204 or the feature processor 206. Those skilled in the art will appreciate that data can be provided from one address controller to any of pixel processors and the feature processor simultaneously or, alternatively, that data can be provided to the pixel processors from any combination of the address controllers simultaneously.

Additionally, each pixel processor 204-1 through 204-3 includes an output having a dedicated connection 302-1 through 302-3 to each of the address controllers 202 and the remaining pixel processors 204. Similarly, the feature processor includes an output having a dedicated connection 304 to each of the address controllers 202. Accordingly, data can be transferred between any pixel processor 204 and any memory circuit 200 via the address controller 202. Similarly, data can be transferred between the feature processor 206 and any of the memory circuits 200 via its associated address controller 202.

Returning to FIG. 2, the plurality of image processors 112 also include a feature memory circuit 208 coupled to the feature processor 206. The feature memory circuit 208 is coupled to transfer data between the feature processor 206 and a local bus 210 of the image processor 112. In addition to storing data in any of the memory circuits 200, the feature processor 206 is further constructed to store data in the feature memory circuit 208.

The plurality of image processors 112 also include a DSP/CPU (digital signal processor/central processing unit) 212 coupled to a processor bus 211 for controlling the operation of the address controllers 202, the pixel processors 204, and the feature processor 206. Additionally, the DSP/CPU 212 is constructed to access data from the feature memory 208. The DSP/CPU 212 is provided for receiving the processed data from the feature processor 206 and for analyzing the image data to determine the features and characteristics of the image represented thereby. In a presently preferred embodiment of the invention, the DSP/CPU 212 is constructed to receive data representing measurement of features of a portion of a cervical Pap smear specimen. The DSP/CPU 212 and the system processor 108 cooperate to analyze the feature measurements to determine the overall status of the specimen, as described more fully in U.S. patent application Ser. No. 07/838,064, entitled *Method For Identifying Normal Biomedical Specimens,* by Alan C. Nelson, et al., filed Feb. 18, 1992, and U.S. patent application Ser. No. 07/838,395, entitled Method For Identifying Objects Using Data Processing Techniques, by S. James Lee et al., filed Feb. 18, 1992, both disclosures of which are incorporated herein, in their entireties, by the foregoing references thereto.

The local bus 210 of each of the image processors 112 is coupled to the data bus 104 of the image capture and processing system 100 by a bus interface 214. The bus interface 214 is controlled by the DSP/CPU 212 and the system processor 108 (FIG. 1) for transferring data and instructions from the DSP/CPU 212 to the system processor 108. Additionally, controller memory 215 is coupled to the DSP/CPU 212 via the local bus 210 for providing program data and instructions to the DSP/CPU 212. The controller memory 215 may also be used by the DSP/CPU 212 for storing image information, e.g., field-of-view image data or feature measurements received from the pixel processors 204 and the feature processor 206. Still further, the controller memory 215 is used by the DSP/CPU 212 and the system processor 108 as a shared memory for transferring image data and data analysis between the DSP/CPU 212 and the system processor 108.

An image bus interface 216 is coupled to the image bus 114 for receiving image data from the image capture board 106. To enable substantially continuous transfer of image data to the image processors 112, two of the memory circuits 200-1 and 200-2 along with their associated address controllers 202-1 and 202-2 are used as queues for storing the field-of-view image data while it is being processed by the pixel processors 204 and the feature processor 206. To this end, field-of-view image data transferred to the image processor 112 from the image capture board 106 is stored in one of the memory circuits 200-1 or 200-2 via the image bus interface 216. The address controllers 202-1 and 202-2 are coupled to the memory circuits 200-1 and 200-2 and an image bus interface 216 via a common node 217. The image bus interface 216 is constructed to control the transfer of image data from the image capture board 106 to the memory circuits 200-1 and 200-2 of the image processor 112. A data bus interface 219 is also coupled to the common node for controlling the transfer of image data to the memory circuits 200-1 and 200-2 from the data bus 104 via the local bus 210 and the bus interface 214. The system processor 108 may use the data bus interface 219 for transferring test images, calibrating images, etc., to the image processors 112 or for saving image data from the memory circuits 200-1 and 200-2 to the memory 110. Techniques for controlling the transfer of information via a common node are well known and need not be discussed in detail here.

In operation, the system processor 108 transfers a field-of-view image to an image processor 112 by controlling the image-capture board 106 to place the field-of-view data on the image data bus 114 and by controlling the image bus interface 216 of the appropriate image processor 112 to transfer the field-of-view image data from the image data bus 114 to one of the memory circuits 200-1 or 200-2. The field-of-view image data remains in the memory circuit 200-1 or 200-2 until all processing is completed. This enables the image processor to access the original field-of-view image data at any time during the processing, as is sometimes necessary. During time when a large number of field-of-view images must be processed, the image processors 112 are constructed so that an image stored in the memory circuit 200-1 may be processed and a second image may be transferred to and stored in the memory circuit 200-2 for subsequent processing. Accordingly, the memory circuits 200-1 and 200-2, in addition to being used for storing the field-of-view image during processing by the image processor 112, are also used as queues for storing an additional field-of-view image for subsequent processing.

A particularly novel feature of the subject invention is that each memory circuit 200 comprises eight memory circuits coupled in parallel and each is constructed to receive a single bit of the eight-bit data word. The address controllers 202 are constructed to provide an eight-bit write control word to each memory circuit 200 wherein a respective one of the eight bits is associated with one of the eight individual one-bit memory circuits. In this manner, the memory circuit 200 may be used to store image data, including a plurality of eight-bit, greyscale data words or may be used to store eight bits relating to eight binary images, without wasting memory space. Those skilled in the art will recognize that the memory circuit 200 described above, may be configured to store an image relating to one or more images totaling eight bits.

As mentioned hereinabove, a particularly novel aspect of the subject invention is the ability of the address controllers 202 to select a portion of the image data to be processed by the pixel processors 204 and the feature processor 206. Selection of a portion of the image data enables the pixel processors and feature processor to perform operations on only desired portions of the image data and thereby conserve data processing time. Further, the address controllers 202 are also constructed for providing information to identify the boundary of an image, or image portion, transferred from the memory circuits 200 to the pixel processors 204 and the feature processor 206. The addition of boundary information to an image, or image portion, is desirable to aid in the filtering and distance transforming of the image or image portion.

Figure 4:
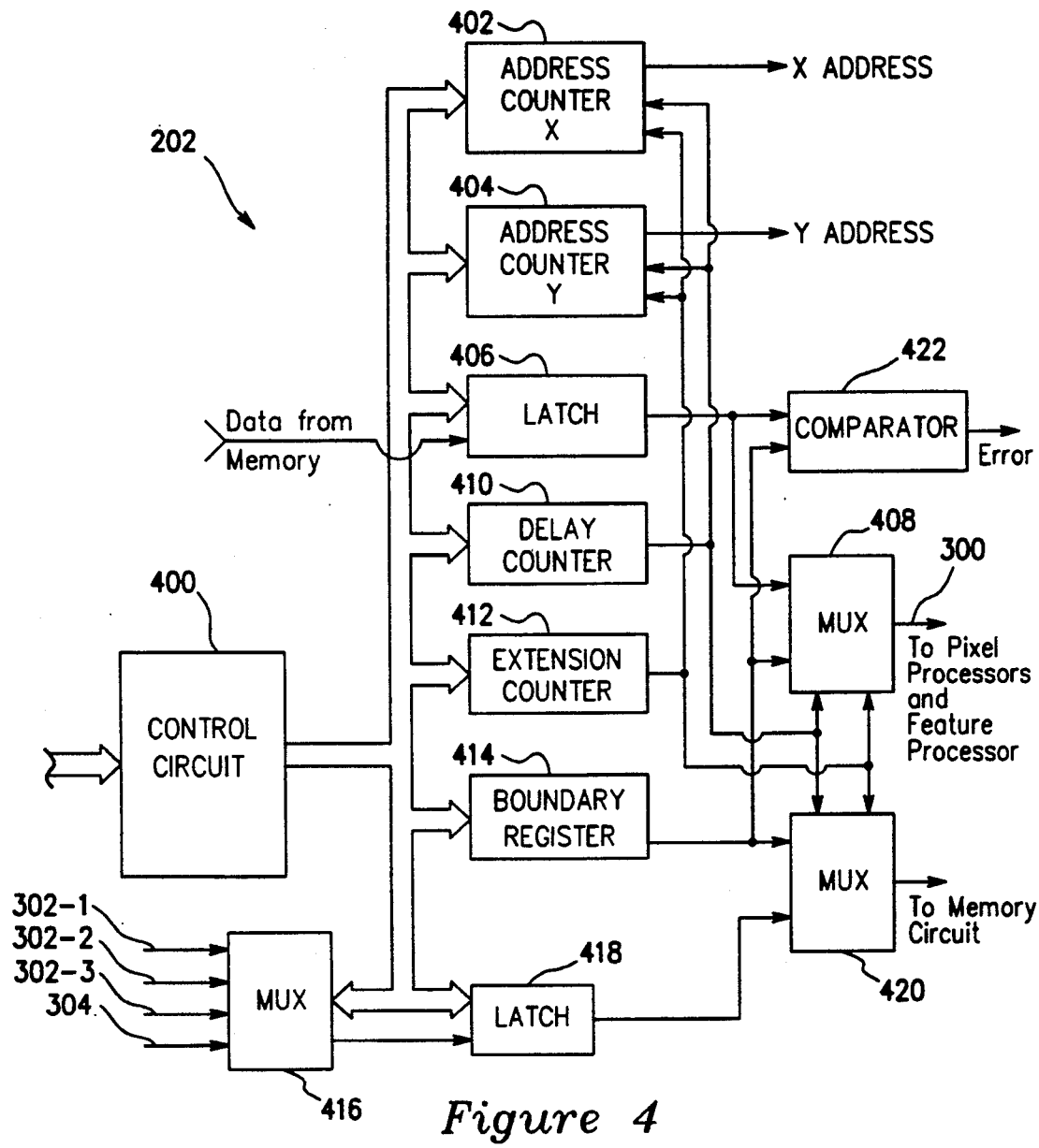
FIG. 4 is an illustrative block diagram of the address controller illustrated in FIG. 2.

With reference to FIG. 4, a more detailed illustrative diagram of an address controller 202 is provided. Although one address controller 202 is illustrated in FIG. 4, it will be apparent to those skilled in the art that each of the address controllers 202-1 to 202-6 illustrated in FIG. 2 operate in a manner similar to the address controller 202 illustrated in FIG. 4.

To provide image portions, the address controller 202 includes a control circuit 400 coupled to receive data and instructions from the DSP/CPU 212 (FIG. 2). The control circuit 400 is coupled to a X address counter 402 and a Y address counter 404 for providing address data and timing signals thereto. The X address counter 402 and the Y address counter 404 are constructed to provide the X and Y addresses to the memory circuit 200 with which the address controller 202 is associated for selecting data to be transferred from the memory circuit to the address controller 202. The X and Y address counters 402 and 404, respectively, are each capable of being programmed to a predetermined start address and are capable of counting either up or down. Accordingly, by providing the appropriate start address to the X and Y address counters 402 and 404, and by either incrementing or decrementing the address counters, the address controller can be programmed to select a portion of the image stored in its associated memory circuit 200, from left to right or top to bottom. Still further, the X and Y address counters 402 and 404 are each constructed to count in predetermined increments so that incremental portions of the image data can be provided as the output of the address controller 202. The X and Y address counters 402 and 404 are also constructed to repeat an address so that the image data of the address is repeated. Providing incremental portions of an image is useful for conserving processing time when details of the image are not necessary to accumulate results of the process. Repeating the data of an image is useful for processes having expanded cycle times, e.g., histogram operations.

The address controller 202 is also constructed to provide a predetermined boundary around the image, or image portion, represented by the image data provided by the memory circuit 200. To this end, data selected by the X and Y address counters 402 and 404 are provided from the memory circuit 200 to a multiplexor 408 via a latch 406. The multiplexor 408 is controlled by a delay counter 410 and an extension counter 412 for selecting as the data output of the address controller either the stored image data via the latch 406 or predetermined boundary data from a boundary register 414. The delay counter 410 and the extension counter 412 are each coupled to the X and Y address counters 402 and 404, respectively, for disabling the address counters when the boundary data is being provided as the output of the multiplexor 408.

The boundary register 414 is provided for storing data representing a desired boundary condition of an image or image portion. The delay counter 410 and extension counter 412 are provided for determining how much boundary is provided around the image or image portion provided by the address controller 202. Particularly, the delay counter 410 determines the amount of boundary provided before and, as a practical matter, after the image, or image portion, represented by the image data while the extension counter determines the amount of boundary provided before and after each line of the image, or image portion, represented by the image data. The delay counter 410 is also used to delay the X and Y address counters 402 and 404 so that they begin providing addresses to store the results of a process at the proper time.

In operation, the delay counter 410 and extension counter 412 are programmed with margin values by the control circuit 400. The delay counter controls the multiplexor 408 to provide as its output the output from the boundary register 414 for a number of clock cycles required to create the amount of boundary specified by its programmed boundary data. Thereafter, the multiplexor 408 is controlled to provide a line of image data from the latch 406. After each line of image data is provided, the extension counter 412 controls the multiplexor 408 to provide the boundary data from the boundary register 414 as the address controller output for a number of clock cycles selected to provide the amount of boundary specified by the margin values programmed in the extension counter 412. In this manner, the data provided by the memory circuits 200 representing an image, or an image portion, will include a boundary wherein the value of the boundary is specified by the boundary values stored in the boundary register 414, and wherein the amount of the boundary is determined by the margin values stored in the delay counter 410 and the extension counter 412. It will be apparent to those skilled in the art, that the address counters 402 and 404 may be programmed so that an image portion will be provided with or without a boundary provided by the delay counter 410, extension counter 412, and boundary register 414.

As discussed above, the address controller 202 is also constructed for coupling the plurality of pixel processors 204 and the feature processor 206 to the memory circuit 200 with which the address controller 202 is associated. Accordingly, a multiplexor 416 and a latch 418 are coupled to the plurality of dedicated connections 302-1 through 302-3 of the pixel processor 204-1 through 204-3 (FIG. 3) and the dedicated connection 304 of the feature processor 206. The multiplexor 416 is controlled by the control circuit 400 to select input from one of the pixel processors 204 or the feature processor 206.

In addition to cooperating to provide boundary information for data representing an image, or portion of an image, provided by the address controller 202, the boundary register 414 also cooperates with a comparator 422 to provide a unique testing arrangement for the memory circuit 200 associated with the address controller 202. A multiplexor 420 is provided for selecting as the input to the memory circuit 200 either the data provided by the multiplexor 416 or the boundary register 414. To test the memory circuit 200 associated with the address controller 202, the boundary register 414 is programmed with a test sequence by the control circuit 400. The multiplexor 420 is controlled to provide the test sequence from the boundary register 414 as the input to the memory circuit 200. The test sequence stored in the boundary register 414 is selected so that a uniquely sequenced pattern of ones and zeros will be stored in the memory circuit 200. Thereafter, data is read from the memory circuit through the latch 406 and compared, in a comparator 422, with the test sequence in the boundary register 414. If the pattern read from the memory circuit 200 is not the same as the test sequence generated by the boundary register 414, then the comparator 422 indicates an error in the memory circuit 200.

The elements comprising the address controller 202, as illustrated in FIG. 4, may be comprised of any of a number of commercial devices readily available to those skilled in the art. In the presently preferred embodiment of the invention, the address controller 202 comprises an application specific integrated circuit designed to perform the functions illustrated and described by reference to FIG. 4. However, other devices, such as discrete devices, may be readily substituted therefor.

Figure 5:
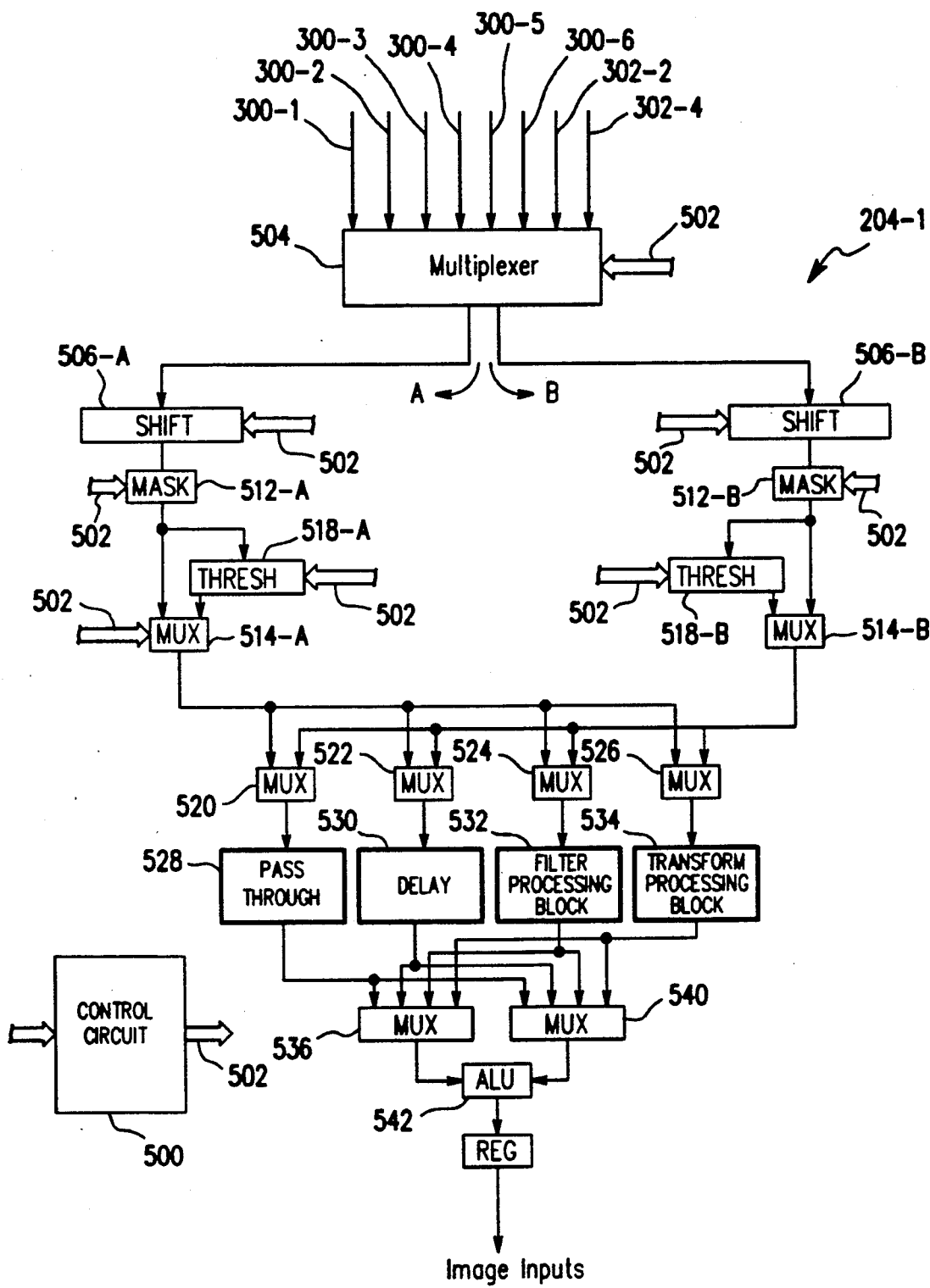
FIG. 5 is an illustrative block diagram of the pixel processor illustrated in FIG. 2.

Returning again to FIG. 2, the plurality of pixel processors 204 are constructed for performing parallel and pipelined data processing functions on the image data provided to the image processor 112. Particularly, the pixel processors 204 are constructed to perform distance transforms, binary morphology, greyscale morphology, binomial filtering, arithmetic operations, logic operations, thresholding, and zone of influence analyses, each in a substantially pipelined fashion. The pixel processors 204 are programmable by the DSP/CPU 212 to perform any of the above referenced functions. With reference to FIG. 5, a more detailed illustrative diagram of a pixel processor 204-1 is provided. As stated above by reference to the address controller illustrated in FIG. 4, those skilled in the art will appreciate that, although only one pixel processor 204-1 is illustrated in FIG. 5, each of the pixel processors 204-2 and 204-3 is constructed in a manner substantially similar to the pixel processor 204 illustrated in FIG. 5.

The pixel processor 204 includes a control circuit 500 responsive to input control and data signals received from the DSP/CPU 212 for configuring and controlling the operation of the pixel processor 204. The control circuit 500 provides control and data signals to the pixel processor 204 via a control data bus 502. A multiplexor 504 is responsive to control and data signals received from the control circuit 500 to select as the pixel processor input image data from the dedicated connection 300-1 through 300-6 of any of the address controllers 202-1 through 202-6, as discussed above by reference to FIG. 3. Similarly, the multiplexor 504 may select data from the dedicated connection 302-2 and 302-3 from either of the remaining pixel processors 204-2 or 204-3.

The multiplexor 504 is constructed to provide data to simultaneous and substantially similar data paths illustrated as path A and path B. Particularly, the multiplexor 504 is responsive to control signals from the control circuit 500 for selecting any one of its inputs to be provided to path A and, simultaneously selecting any one of its inputs to be provided to path B. As an example, the multiplexor 504 may be controlled to provide image data from memory circuit 200-2, received on the dedicated connection 300-2, to path A while providing processed data to path B from the pixel processor 204-2, received on the dedicated connection 302-2. As another example, the multiplexer 504 could be controlled to provide data received from memory circuit 200-2 to both path A and B, simultaneously.

Paths A and B are each provided for parallel processing of image data. Since the data processing that can be provided to the image data by the elements of path A is identical to the data processing that can be provided to the image data by the elements of path B, only path A will be described in detail below. However, it will be apparent to those skilled in the art, that the construction and operation of path B is the same as described below by reference to path A. Further, it will be apparent that although only two paths are described herein, more paths could easily be provided, if desired.

Image data selected by the multiplexor 504 and provided to path A is received in a shift register 506. The shift register 506 is constructed to receive and shift a pixel data word so that a selected group of the bits comprising the pixel data word can be selected. This group of pixels can then be combined with masking bits in a mask register 512. The resulting data can then be selected by a multiplexor 514 as the output from path A. Data processing as described above is valuable for selecting the appropriate bit of a binary mask from the multibit data words stored in memory and for masking an image with a grey shade prior to processing.

Alternatively, the masked or unmasked data from the AND gate 510 can be provided to a threshold detector 518. A predetermined value is provided as the output of the threshold detector if the masked or unmasked image data is above or below a threshold provided by the DSP/CPU 212 via the control circuit 500. The output from the threshold detector 518 can be selected as the output from path A via the multiplexor 514. Use of the threshold detector 518, as described above, is valuable for many operations. The outputs from path A and path B are provided to a plurality of multiplexors 520–526. The multiplexors 520–526 are constructed to provide their output to a respective plurality of processing circuits 528–534. Accordingly, the output from path A or path B may be provided as the input to either processing block 528–534 via the multiplexors 520–526.

The processing circuits 528–534 are each constructed to perform a unique data processing function on their input and provide their output to multiplexors 536 and 540. Pass-through processing circuit 528 is constructed to simply couple the output from the multiplexor 520 to the multiplexors 536 and 540. Delay processing circuit 530 is constructed to provide a delay between the output of the multiplexor 514 and the multiplexors 536 and 540. The pass-through processing circuit 528 and the delay processing circuit 530 may be readily constructed by those skilled in the art.

Figure 6:
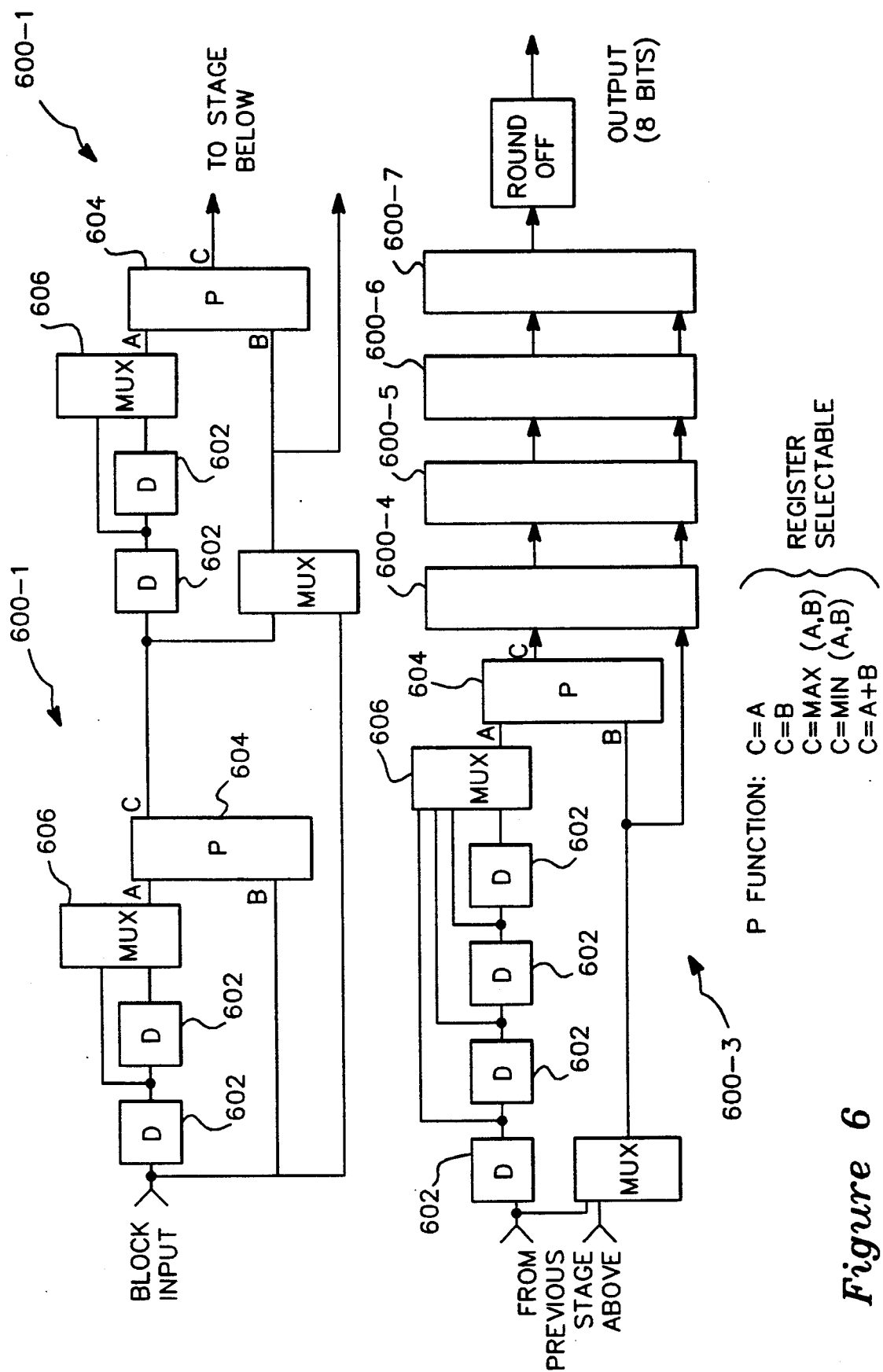
FIG. 6 is an illustrative block diagram of a novel binomial filter for use with the pixel processors illustrated in FIG. 5.

FIG. 6 is an illustrative block diagram of a binomial filter for use as the filter processing block 532 of the pixel processors 204 (FIG. 5). The binomial filter includes a plurality of filtering blocks 600 wherein each filter block may be configured for generating and applying a binomial-shaped filter. As an example, each filter block 600 is constructed to receive a series of data inputs and provide as its output a series of data words wherein each data word represents a sum of selected portions of the input sequence. As an example, if the input to a filtering block is a sequence of data words, $X_0$, $X_1$, $X_2$, $X_3$, . . . $X_n$, then the filtering block may be programmed to provide as its output a series wherein each data bit is equal to $X_0+2X_1+X_2$.

More particularly, filtering blocks 600-1 and 600-2 are constructed with two delay circuits 602 and a processing block 604. As is known in the art, the delay circuits 602 are constructed to provide a clock pulse delay so that data entering during one clock pulse will be delayed a single clock pulse to its output. The multiplexer 606 is provided for selecting either data having two delays or one delay as the input to the processing block. Similarly, the filtering blocks 600-3 through 600-7 are each constructed to implement a four-delay filter as illustrated in more detail by block 600-3. The processing block 604 is selected to implement the function, as shown in FIG. 6. That is, the output of the processing block can be equal to either input, the maximum of either input, the minimum of either input, or the sum of both inputs.

It will be appreciated by those skilled in the art that, when the sum function is selected, the filtering block 600 will be constructed to provide a binomial filter, the coefficients of which are determined by the signals that are selected by the multiplexor 606. When either the maximum or minimum function is implemented by the processing block 604, the filtering block 600 will be constructed to provide a grey-level morphological operation wherein the pixels to be compared are determined by the signals that are selected by the multiplexor 606. Accordingly, the filter processing block 532 is provided for performing operations on adjacent pixels and is configurable for selecting various pixels to be operated upon. Accordingly, the filter processing block 532 illustrated in FIG. 6 may be programmed by the DSP/CPU 212 via the control circuit 500 to implement a binomial filter or grey scale morphological filter of various stages and constructions. Binomial filtering and grey scale morphological filtering of image data are both desirable to determine the effect of the value of adjacent and non-adjacent neighboring pixels on a subject pixel.

Figure 7A:
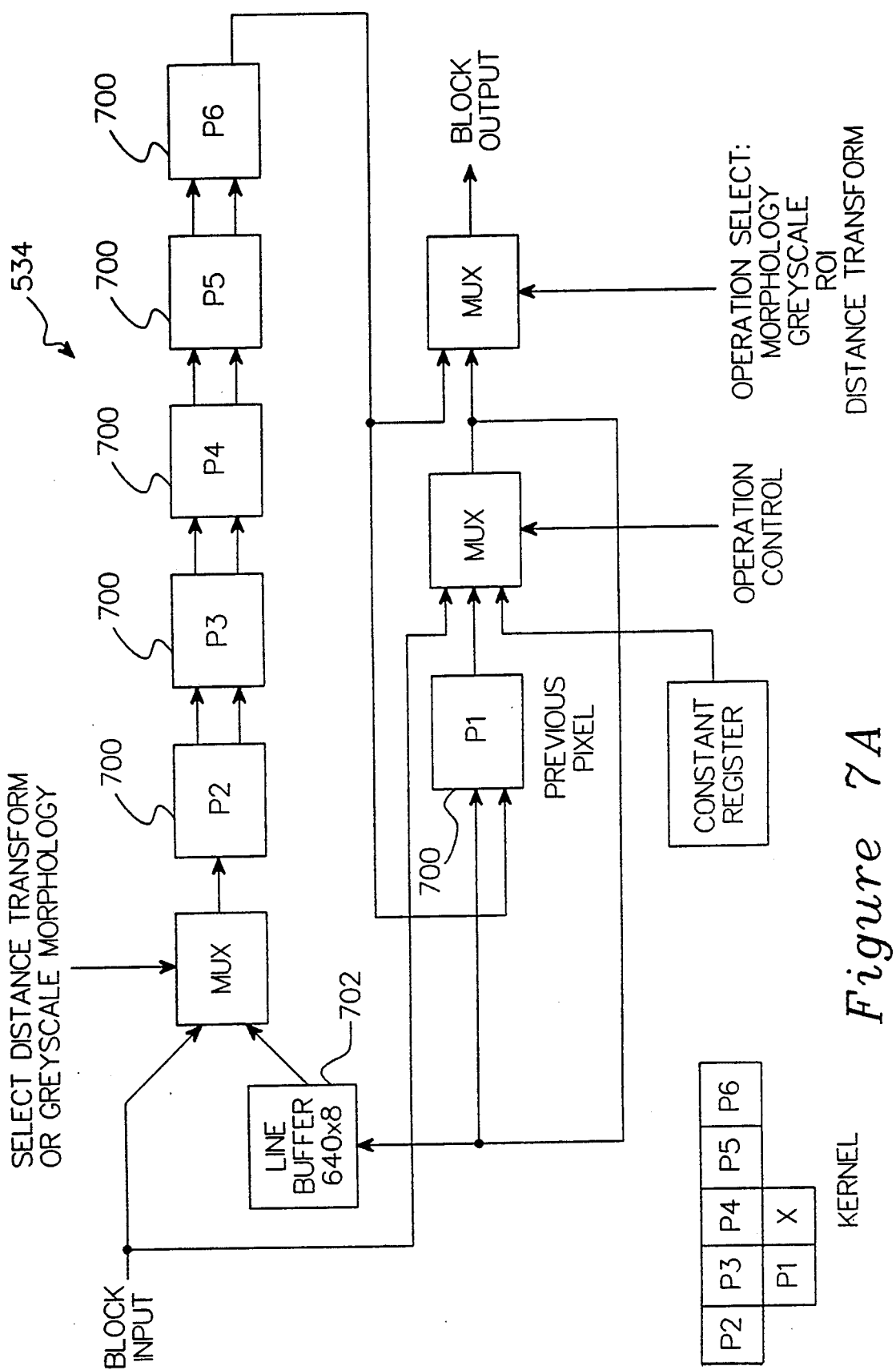
FIGS. 7A and 7B are illustrative block diagrams of a novel morphological processing engine for use with the pixel processors of FIG. 5.
Figure 7B:
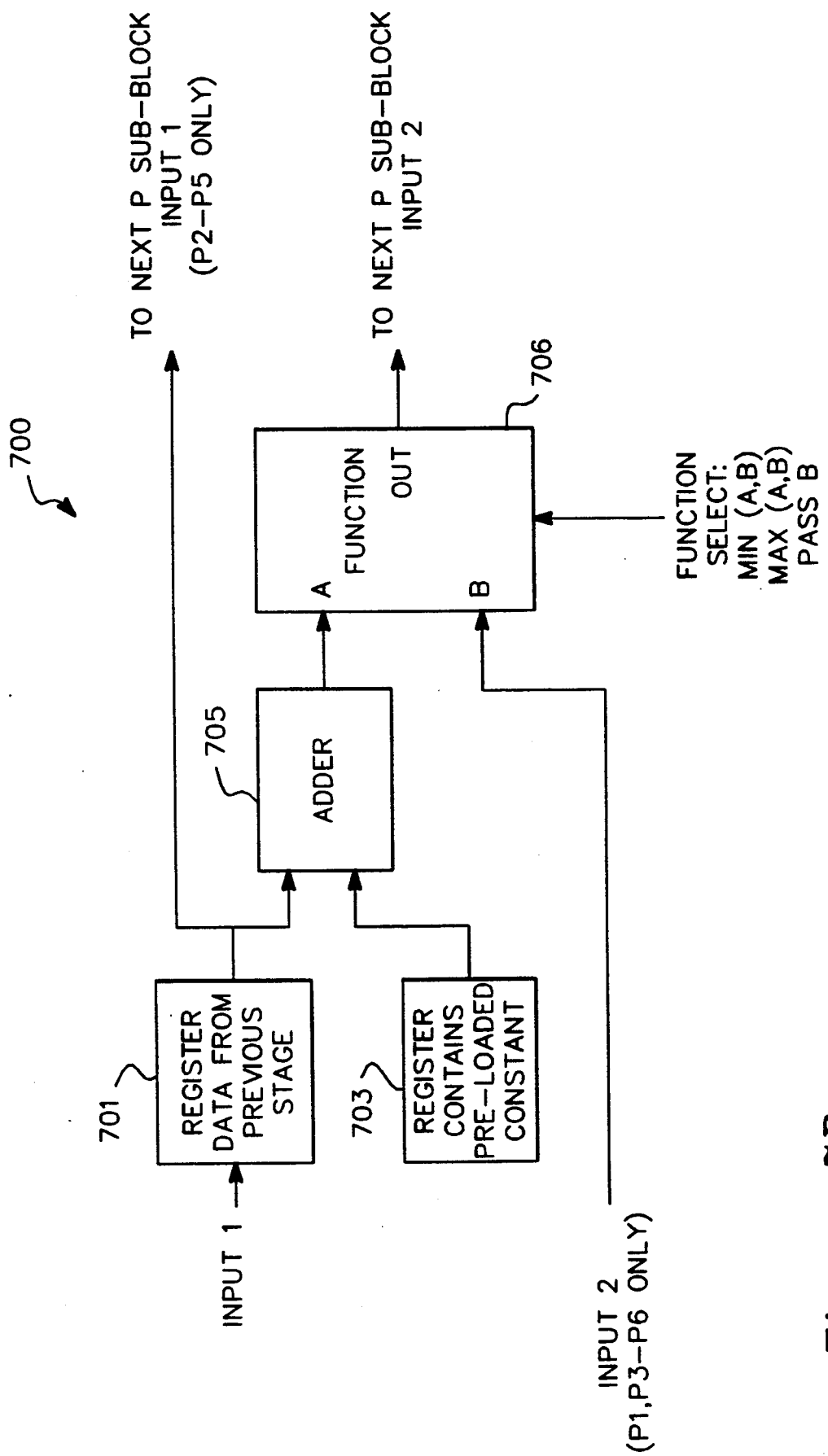

FIGS. 7A and 7B are more detailed illustrative block diagrams of the transform processing block 534 of pixel processors 204 (FIG. 5). With reference to FIG. 7A, the transform processing block 534 includes a plurality of operation sub-blocks 700, each having a register 701 (FIG. 7B) for storing data from a previous stage and a register 703 for storing a preloaded constant. Each operation block 700 further includes an adder 705 for adding the contents of the registers 701 and 703. A function block 706 is included for implementing a variety of functions, including selecting the minimum of its inputs as its output, selecting the maximum of its inputs as its output, or passing one of its inputs as its output. Returning to FIG. 7A, the plurality of operation blocks are serially coupled for receiving the image data. The line buffer 702 is constructed to store a line of image data for use by the transform processing block 534 when performing a distance transform.

Like the filter processing block 532, the transform processing block 534 may be configured for performing operations on neighboring pixels. More particularly, the transform processing block 534 may be configured to implement binary or greyscale morphological operations and distance transform operations.

A particularly novel aspect of the subject invention is the ability of the filter processing block 532 and the transform processing block 534 of the pixel processors 204 to cooperate with the memory circuits 200 and address controllers 202 to enable substantially two-dimensional processing of pixel data in a pipelined fashion. As discussed above, the address controller 202 is constructed so that data representing pixels of an image, or portion of an image, may be provided from the memory circuit to the pixel processors from left to right, right to left, bottom to top, or bottom to top. To perform two-dimensional processing of an image, the image is provided to the pixel processor in two passes, a first time providing the image in a first sequence, e.g., left to right and top to bottom, and a second time providing the image in a second sequence, e.g., top to bottom and right to left. In this manner, the filter processing block 532 and transform processing block 534 may be constructed to perform their intended operation on all neighbors, i.e., adjacent and non-adjacent neighbors in both dimensions, of pixels contained in a two-dimensional image. Those skilled in the art will readily appreciate that the subject invention could readily be extended to images having three or more dimensions by increasing the number of passes through the pixel processor and by reconfiguring the address controller to enable three-dimensional access of the memory circuit 200.

Figure 8:
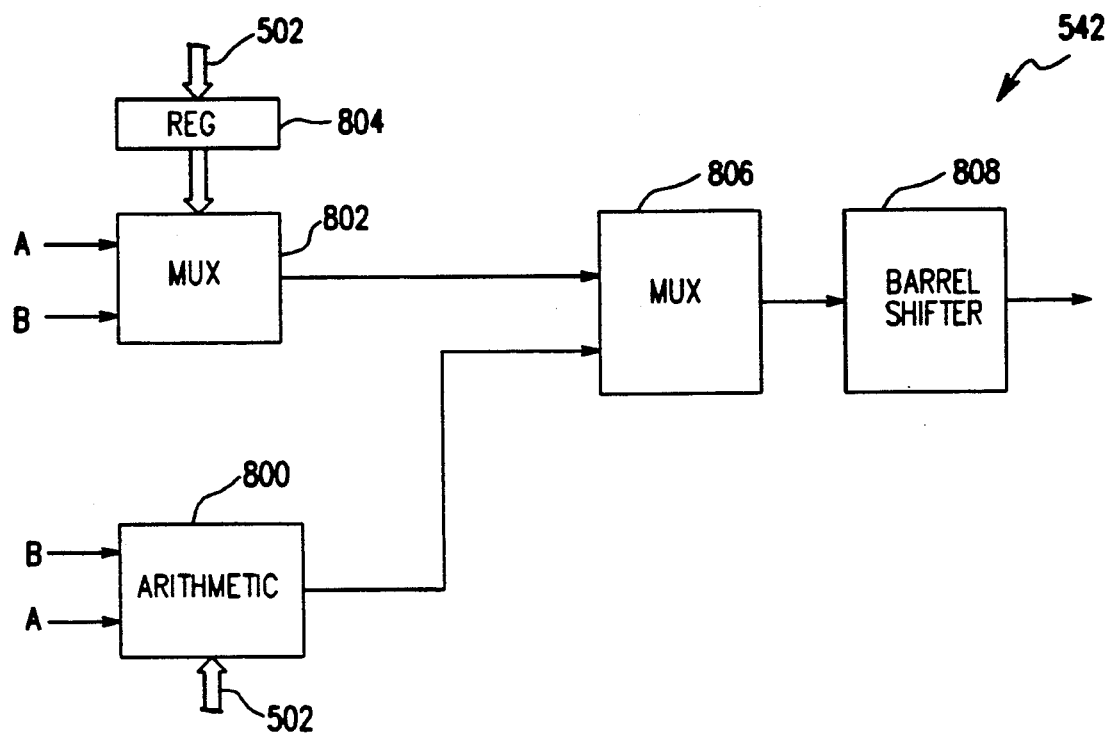
FIG. 8 is an illustrative diagram of a novel programmable arithmetic logic unit for use with the pixel processors of FIG. 5.

In FIG. 8, the arithmetic logic unit 542 of pixel processors 204 (FIG. 5) includes an arithmetic unit 800 coupled to receive an A input from the multiplexor 536 and a B input from the multiplexor 540. The arithmetic unit 800 is constructed to perform standard arithmetic operations on the input, as, for example, add a constant, add two inputs, subtract the two inputs, etc.

The arithmetic logic unit 542 also includes a multiplexor 802 coupled to a register 804 for performing logic operations on the A and B input from the multiplexors 536 and 540, respectively. More particularly, the multiplexor 802 is constructed to select a bit of the output from a register 804 as its output in response to control information received on its input. The control input to the multiplexor 802 is coupled to the A and B input to the arithmetic logic unit, i.e., the output from the multiplexors 536 and 540 (FIG. 5). Accordingly, by selecting the data word stored in the register 804, the multiplexor 802 can be used to provide predetermined arithmetic logic functions in response to various combinations of data received at its control input from the A and B input to the arithmetic logic unit. A multiplexor 806 is provided for selecting the output of the arithmetic logic unit 542.

As mentioned above, the memory circuits 200 are each capable of storing a plurality of eight-bit, greyscale data words or may be used to store eight binary bits relating to eight separate binary images. The barrel shift register 808 may be used to position a single bit of a binary image in the proper eight-bit data word bit position for storage in a selected one of the single-bit memory circuits. The barrel shift register 808 is therefore used to position binary data in the proper bit position before storage.

Figure 9:
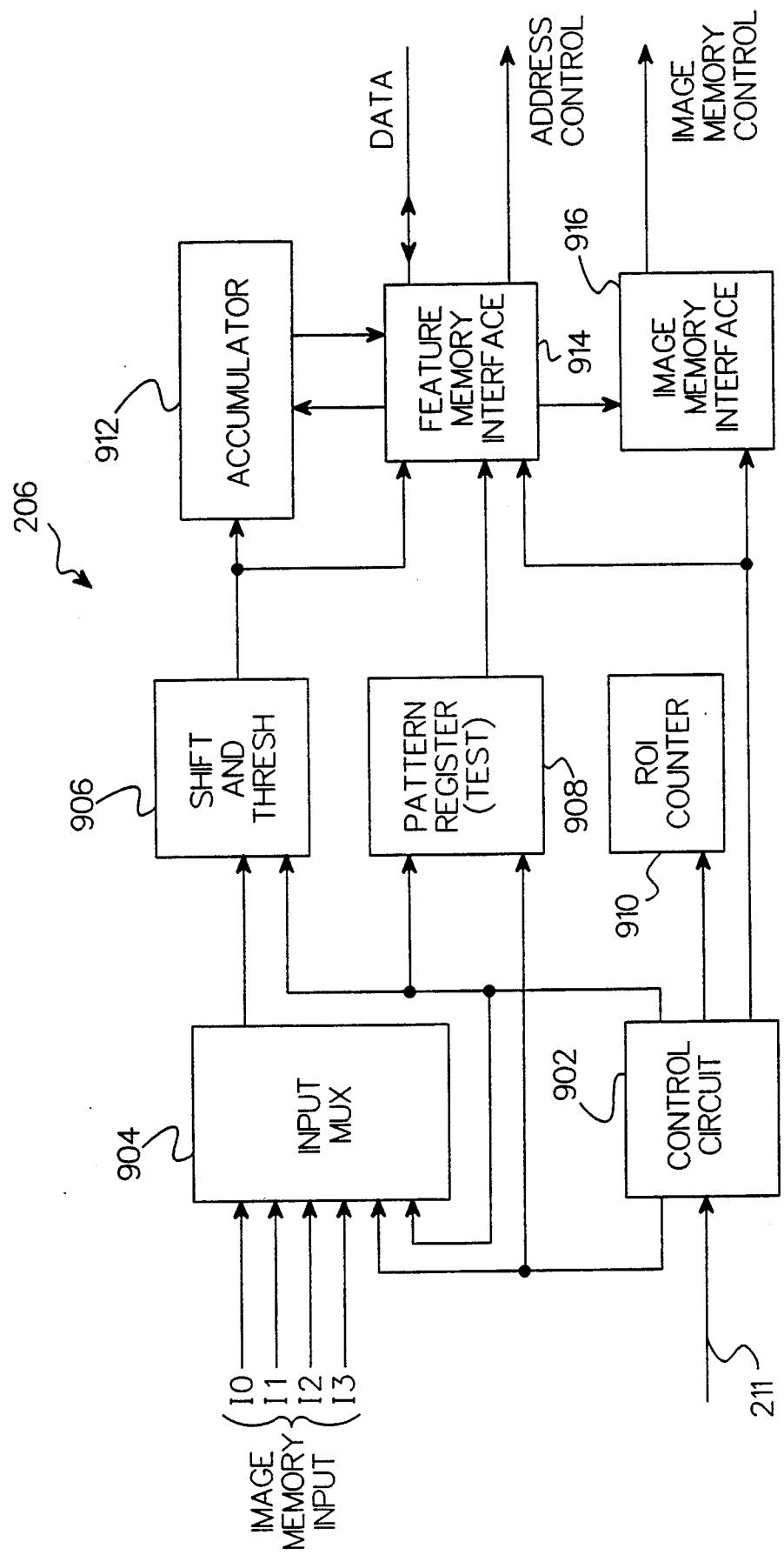
FIG. 9 is an illustrative diagram of a feature processor for use with the subject invention.

With reference to FIG. 9, a more detailed illustrative diagram of the feature processor 206 is provided. The feature processor 206 includes a control circuit 902, constructed to receive address, control, and data from the DSP/CPU 212 to aid in control of the feature processing block 206. An input multiplexer 904 is constructed to receive the input to the feature processor from the memory circuits 200-3 through 200-6 via the address controller 202-3 through 202-6, respectively. A shift and threshold circuit 906 is constructed to perform threshold or shifting operations, as discussed above with respect to the pixel processors 204. A pattern register 908 is constructed for generating data with a predetermined pattern as a test feature for testing the feature memory 208, in a manner similar to that discussed above with respect to the boundary register 414 and the memory circuits 200. However, with respect to the testing of the feature memory 208, the DSP/CPU 212 verifies the accuracy of the pattern read from the feature memory. A ROI counter 910 is providing for identifying regions of interest in a manner similar to the X and Y address counters 402 and 404 of the address controllers 202. An accumulator 912 may be provided for performing standard arithmetic operations as is known in the art. A feature memory interface 914 and an image memory interface 916 are provided for interfacing the feature processor with the feature memory 208 and the memory circuits 200-3 through 200-6, respectively.

Those skilled in the art will appreciate that the above-described feature processor may be programmed by the DSP/CPU 212 to perform the following functions, lookup table operations, histogram and conditional histogram operations, grey-level and conditional accumulation, and run-length encoding operations.

With the exception of conditional histogram, the above-noted operations are well known in the art and, therefore, need not be discussed in detail here. The conditional histogram, however, is a novel operation for performing a plurality of histogram operation simultaneously. In accordance with the conditional histogram operation performed by the above-described feature processor, an image is first partitioned into designated regions. As an example, an image may be partitioned by objects so that each object and the background are identified as separate regions. Thereafter, in accordance with the conditional histogram operation of the subject invention, a histogram is performed on the image so that a separate histogram is performed for each region. Accordingly, in the above example, a histogram will be performed on each object and the background.

It will be apparent to those skilled in the art that although only several presently preferred embodiments of the invention have been described in detain herein, many modifications and variations may be provided without departing from the true scope and spirit of the invention. Accordingly, the invention is not limited except as by the appended claims.

We claim:

1. Apparatus for rapidly processing data sequences comprising:

a plurality of memory circuits for storing the data sequences wherein each of said plurality of memory circuits includes a memory input and a memory output;

a plurality of processing circuits for processing the data sequences wherein each of said plurality of processing circuits includes a data output for providing an output data sequence, each of said plurality of processing circuits further including a first multiplexer circuit for receiving a plurality of input data sequences wherein said first multiplexer circuit is responsive to a first select control signal for selecting at least one of the plurality of input data sequences to be processed to provide the output data sequence;

a plurality of controller circuits, each associated with a respective one of said plurality of memory circuits for simultaneously transferring the data sequences between one of said plurality of memory circuits and each of said plurality of processing circuits, said plurality of controller circuits each including a second multiplexer circuit for receiving the plurality of output data sequences and being responsive to a second select control signal for selecting at least one of the plurality of output data sequences to be stored in its respective one of said plurality of memory circuits; and central processor means responsive to user provided input for providing said first and second select control signals to control the transfer of the data sequences between said plurality of memory circuits and said plurality of processor circuits.

2. The apparatus as recited in claim 1 wherein each of said plurality of memory circuits is responsive to an X and Y address for storing and recalling the data sequences and wherein each of said plurality of controller circuits further comprises:

first and second registers for providing said X and Y addresses to said plurality of memory circuits, said first and second registers being responsive to register control signals received from said central processor means for providing said X and Y addresses in increasing and decreasing order, said first and second registers being programmable in response to program addresses received from said central processor means, said central processor means being further constructed to provide said register control signals so that said first and second registers provide said X and Y addresses consecutively and so that said first and second registers provide said X and Y addresses in a manner such that said X and Y addresses increase and decrease by a constant factor.

3. The apparatus as recited in claim 1 wherein said plurality of processing circuits includes a feature processing circuit, said apparatus further comprising:
a feature memory circuit constructed for receiving and storing data from said feature processor circuit, said feature memory circuit being further constructed to provide output to said feature processing circuit and said central processing means so that the data sequences are transferable from said plurality of memory circuits to said central processing circuit via said feature processing circuit and said feature memory circuit.

4. The apparatus as recited in claim 1 wherein one of said plurality of processing circuits further includes a multiplexing circuit including first and second control inputs and a plurality of data inputs and wherein said multiplexing circuit is constructed to provide one of said plurality of data inputs and a multiplexing circuit output in response to the data present at said first and second control inputs, said multiplexing circuit being constructed to receive first and second data inputs at said first and second control inputs, respectively, and to receive a control word at said plurality of data inputs so that the data provided at said multiplexing circuit output is an arithmetic logic function of the respective values of said first and second data inputs and so that the arithmetic logic function is determined by the value of said control word.

5. The apparatus as recited in claim 1 wherein each of said plurality of address controllers comprises:
boundary shift register means for providing boundary data to be added to the data sequences, said boundary shift register means being programmable by said central processing means so that said boundary data is determined by said central processing means, said boundary shift register means being responsive to shift register control signals received from said central processing means for combining said boundary data with the data sequences.

6. The apparatus as recited in claim 5 wherein said boundary shift register means further comprises multiplexer means constructed to receive the data sequences and to receive said boundary data, said multiplexer means being responsive to said shift register control signals for providing either said boundary data or the data sequence as its output.

7. The apparatus as recited in claim 1 further comprising selection register means for selecting a portion of the data sequences to be transferred to said plurality of processing circuits, said selection register means being responsive to region of interest signals received from said central processing means for skipping an initial portion of the data sequences and being responsive to said region of interest signals for providing a predetermined portion of the data sequence and for skipping an intermediate portion of the data sequence.

8. The apparatus as recited in claim 7 wherein said selection register means comprises:
boundary shift register means responsive to said central processor means for providing boundary data to be added to the data sequences, said boundary shift register means being programmable by said central processing means so that said boundary data is determined by said central processing means;
multiplexer means constructed to receive the data sequences and to receive said boundary data, said multiplexer means being constructed for providing said boundary data and the data sequence as its output;
a delay register for determining a length of the initial portion of the data sequence to be skipped, said multiplexer means being responsive to said delay register so that said boundary data is provided as the output of said multiplexer means while the initial portion of the data sequence is being skipped; and
an extension register for determining the length of the intermediate portion of the data sequence to be skipped, said multiplexer means being responsive to said extension register so that said boundary data is provided as the output of said multiplexer means while the intermediate portion of the data sequence is being skipped.

9. The apparatus as recited in claim 1 wherein each of said plurality of processing circuits comprises:
first and second data paths each programmable to perform a shift operation to transfer any digit of a multiple bit data word to a predetermined bit position and each said first and second data path begin further programmable to perform a threshold operation on a multiple bit data word;
first and second data processing block means programmable to perform data processing on said input data sequences, and
output multiplexer means for receiving the output from said first and second data paths and programmable to provide the output from the first and second data paths to said first and second data processing blocks.

10. Apparatus for multi-dimensional processing of data sequences having values, wherein the data sequence includes a plurality of data words, said apparatus comprising:
memory means for storing the data sequences, said memory means having an output which is responsive to memory control signals, said output providing the data sequences in at least a first and second order;
processing means responsive to configuration control signals for processing the data sequences provided by said output to alter the value of at least a portion of the data words in the data sequence in response to the value of immediate and non-immediate neighboring data words; and
data processor means for providing said memory control signals and said configuration control signals to control the operation of said memory means and said processing means, said data processing means being constructed to provide said memory control signals a first time to access the data sequences in the first order so that the value of at least a portion of the data words in the data sequence is altered in response to immediate and non-immediate neighboring data words in a first dimension and to provide said memory controls signals a second time to access the data sequences in the second order so that the value of at least a portion of the data words in the data sequence is altered in response to immediate and non-immediate neighboring data words in a second dimension.

11. The apparatus as recited in claim 10 wherein said processing means comprises means for binomial filtering of the data sequences.

12. The apparatus as recited in claim 10 wherein said processing means comprises means for performing morphological operations on the data sequences.

13. The apparatus as recited in claim 10 wherein said memory means comprises:
   a memory unit for storing the data words of the data sequences, said memory unit being responsive to address signals for providing the stored data words as the output of said memory means, and
   a memory controller responsive to said memory control signals for providing said address signals to access said memory unit, said memory controller being constructed to provide said address signals so that the data sequence is provided in the at least first and second order.

14. A method for multi-dimensional processing of data having values, wherein the data includes a plurality of data words combined in a data sequence, said method comprising the steps of:
   providing the data in a first sequence to a processing engine wherein the processing engine is constructed to process the data to alter the value of a subject data word based upon the value of immediate and non-immediate neighboring data words; and
   providing the data in a second sequence to the processing engine so that the processing engine processes the data to alter the value of a subject data word based upon the value of immediate and non-immediate neighboring data words and so that the result is to process the data in two dimensions.

* * * * *